Feb. 23, 1965 C. Q. LEMMOND 3,171,106
INFORMATION STORAGE SYSTEM
Filed Feb. 27, 1961

Inventor
Charles Q. Lemmond
by Allan M. Sutton
His Attorney

United States Patent Office 3,171,106
Patented Feb. 23, 1965

3,171,106
INFORMATION STORAGE SYSTEM
Charles Q. Lemmond, Scotia, N.Y., assignor to General Electric Company, a corporation of New York
Filed Feb. 27, 1961, Ser. No. 92,025
1 Claim. (Cl. 340—174.1)

This invention relates to a method and apparatus for storing information on and retrieving information from a thermoplastic medium, and more particularly, to a method and apparatus wherein the stored information is represented by changes in a magnetic material associated with the thermoplastic storage medium.

The recording and storing of information in a permanent and easily reproducible form is a technological problem of considerable importance. Demands on such a system, in terms of speed, density of storage, resolution, etc., have become increasingly severe. Various techniques such as photographic recording, dielectric recording, and magnetic core recording have been used in the past to attempt to satisfy these demands. While each of these may be employed in satisfactory environments and under certain conditions, all have shortcomings which limit their utility.

In the recent past, several novel recording and storage techniques have been developed which provide many advantages over the recording and storage techniques heretofore known. One such technique contemplates recording information on a deformable plastic medium in the form of minute light modifying deformations. The information bearing deformations are formed on the storage medium by depositing charges on the medium surface by an electron beam in a pattern representing the information to be stored. The deformable storage medium is then softened by the application of heat, and the electrostatic forces due to the charge pattern deform the material to produce physical deformations corresponding to the charge pattern. Upon cooling, the medium solidifies and the deformations are permanently formed in the surface of the storage medium and retained unless deliberately erased by reheating. The information stored in the form of these deformations is retrieved by projecting a beam of light through the medium. The projected light is deflected or defracted by the deformations to produce a spatial light image corresponding to the original image, which may be viewed directly or may be converted to electrical signals by means of light sensing devices such as photomultipliers or the like. A complete disclosure of such a system may be found in U.S. Patent Number 3,113,179—issued December 3, 1963—entitled "Method and Apparatus for Recording," W. E. Glenn, inventor, and assigned to the assignee of the present invention.

Another recent development contemplates producing a charge pattern on a deformable storage medium directly from a light image without the intervention of a modulated electron beam. This method and apparatus are disclosed in patent application Serial No. 862,249, filed December 28, 1959, by S. P. Newberry, now Patent No. 2,981,699, and assigned to the assignee of the present invention. In that disclosure, a photosensitive temporary storage element such as selenium is uniformly charged and then exposed to the light image to be stored. The impinging light so modifies the electrical characteristics of the photosensitive element that the charge leaks off selectively in accordance with the light characteristics of the image. This charge pattern is then transferred to a deformable storage medium such as thermoplastic film by applying a polarizing transfer voltage between the photosensitive element and the thermoplastic. The charge pattern on the deformable storage medium is then developed by softening the thermoplastic film so that the electrostatic forces due to the charge pattern deform the thermoplastic medium to form corresponding deformations. Again, the information stored in the form of the deformations is retrieved by projecting a beam of light through the medium.

Both of the techniques mentioned above have the disadvantage that the stored information must be retrieved or read out by optical means. If electrical signals representative of the stored data are desired for use in a computer or the like, the optical image must be scanned by a light sensitive device to convert the image into the desired electrical signals. In addition, because of the requirement for optical readout, the base material upon which the thermoplastic film is carried must be optically clear and smooth, because any inherent deformations or defects therein will affect the light image that is produced in the process of recovering the stored information.

It is a primary object of this invention, therefore, to provide a method and apparatus for electronically storing information on a thermoplastic medium and for electronically retrieving such stored information.

It is another object of this invention to provide a method and apparatus for storing and retrieving information utilizing a deformable storage medium wherein the storage medium is not physically deformed during the storage process and information retrieval does not depend on physical deformation of the storage medium.

It is a further object of the invention to provide a method and apparatus for storing information on a deformable storage medium which does not require that the storage medium or the base upon which the storage medium is carried comply with severe optical requirements.

It is a further object of this invention to provide an information storage system having a high order of storage capacity.

It is another object of this invention to provide an improved thermoplastic storage medium which need not embody the rigorous optical qualities heretofore required.

Further objects and advantages will become apparent as the description of the invention proceeds.

The above-stated objects and advantages are attained in one form of the invention by employing a thermoplastic storage medium in which magnetic particles are randomly dispersed. The storage medium is heated to a plastic condition and subjected to a magnetic field, whereby the magnetic particles, which are free to move about in the plastic medium, are all similarly oriented. While the material is still in a plastic condition, areas of the material are subjected to the action of a magnetic field in a different direction, which is modulated in accordance with the information to be stored. The magnetic particles in the area adjacent the magnetic field are thus reoriented. The thermoplastic medium is then cooled so that the magnetic particles are no longer free to move or reorient themselves in the medium, and a permanent record of the stored information is obtained.

To retrieve the stored information, means which are sensitive to the orientation of the particles are provided to scan across the recorded information and produce electrical signals which reflect the manner in which the particles are oriented in the thermoplastic storage medium and hence reproduce the stored information.

The novel features which are believed to be characteristic of this invention are set forth with particularity in the appended claims. The invention itself, however, together with further objects and advantages thereof, can best be understood by reference to the following description taken in conjunction with the accompanying drawings, in which:

The present invention contemplates the use of very small magnetic particles randomly dispersed and suspended in a thermoplastic medium. Although various particles may be used, elongated single-domain magnetic particles are preferred. Such particles are well known in the art and are described in an article entitled "Fine Particle Magnets" by Paine, Mendelsohn, and Luborsky, which appeared in Electrical Engineering, October 1957, pages 851–857. The references noted in that article are particularly useful in providing a general background in the field of elongated single-domain magnetic particles. Although various materials such as manganese, bismuth, barium ferrite, iron, and iron cobalt have been studied in a single-domain magnetic form, and the invention is in no way limited to any particular magnetic material, iron or iron cobalt are preferred for use as the magnetic particles. The particles may be obtained in various sizes but it is preferred that they be elongated with a diameter of 0.5–1 micron and a length of 2–4 microns. A length to diameter ratio of 4 to 1 is quite suitable.

An article useful in understanding the properties of the preferred type of particles is entitled "Physical and Magnectic Properties of Elongated Single-Domain Iron and Iron Cobalt Permanent Magnets" by Lever, Yamartino, and Falk, which appeared in the Journal of Applied Physics, vol. 29, No. 3, pages 304–306.

Figure 1:
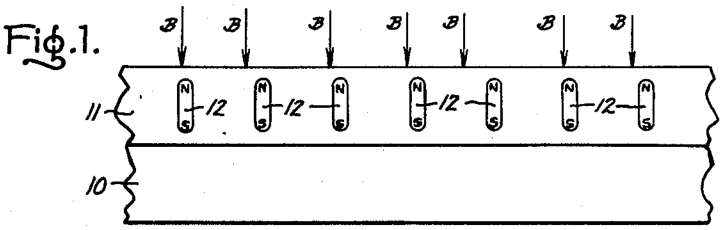
FIGURE 1 is a diagrammatic sectional view of a thermoplastic tape showing the magnetic particles all similarly oriented before data storage.

FIGURE 1 illustrates diagrammatically a storage medium comprising a base 10 having a layer of thermoplastic material 11 applied thereto and containing a plurality of elongated single-domain magnetic particles 12. For purposes of ease of illustration and simplicity of explanation, the particles 12 are shown as being of regular size, evenly distributed, and greatly enlarged over their actual dimensions. It will be understood, however, that in actual practice the particles 12 are of irregular shape ranging from 2–4 microns in length and are randomly distributed in the thermoplastic material 11.

In the present invention, the need for imposing stringent optical requirements on the base material 10 is eliminated and the material may be either optically clear or opaque. However, the base material 10 must be a nonconductor and it should be reasonably smooth and non-plastic at temperatures up to approximately 150° C. Many materials are suitable for this purpose, among which are glass, non-conductive metal, conventional cellulose acetate film base or a polyester film base material such as that sold by the E. I. du Pont de Nemours & Co., Inc., under the trade name "Mylar." Although the thickness of the base material is not critical, excellent results have been obtained using a strip approximately 4 mils thick.

The present invention also does not require that the thermoplastic layer or film 11 have optical properties; hence, it may be either opaque or transparent. However, the thermoplastic film 11 must be resistant to radiation, have a substantially infinite room temperature viscosity and a relatively fluid viscosity at temperatures of 100–150° C. In addition, it should have a high resistivity in ohms per centimeter. One thermoplastic material satisfying all of these requirements is a blend of polystyrene; m-terphenyl; and the copolymer of 95 weight percent of butadiene, and 5 weight percent of styrene. Specifically the composition may be 70 percent polystyrene, 28 percent m-terphenyl, and 2 percent of the copolymer.

The thermoplastic film may be prepared by forming a 10% solid solution of the blend in a toluene solvent and introducing the fine magnetic particles into the solution, of course making sure that the particles are dispersed throughout the solution. The mixture may then be coated onto the base material and the toluene evaporated by air drying and pumping in a vacuum to produce the final deposited article. The thickness of the thermoplastic film 11 may vary from about .01 mil to several mils, with the preferred thickness being in the range of 1–3 mils.

It is pointed out that one important requirement of the thermoplastic film 11 is that it be capable of attaining a relatively low fluid viscosity at a temperature below the Curie point of the material of which the magnetic particles 12 are made. As is well known, if a magnetic material is heated above its Curie point, the magnetic properties of the material are altered and the material becomes paramagnetic. The thermoplastic material previously described fulfills this viscosity requirement and is quite suitable for use in this application.

Referring again to FIGURE 1, the fine magnetic particles 12 are shown with their poles in like position and the particles lying with their long dimensions transverse to the plane of the film. This condition occurs when the thermoplastic film 11 is subjected to heat sufficient to make the film relatively fluid and a magnetic field is impressed across the film at right angles to the plane of the film as shown by the arrows marked B. With the particles 12 being free to move within the fluid film 11, the magnetic field orients substantially all of the particles in the same direction with their axes substantially parallel. It is pointed out that the orientation of the particles may not necessarily be as shown with all of the north poles nearest the outer surface of the film but they may also be reversed and have their south poles adjacent the outer surface of the film. Furthermore, the particles may be subjected to a magnetic field in virtually any direction, so long as it is of sufficient strength and time duration to orient substantially all of the particles so that their axes make substantially identical angles with the plane of the thermoplastic film.

Figure 2:
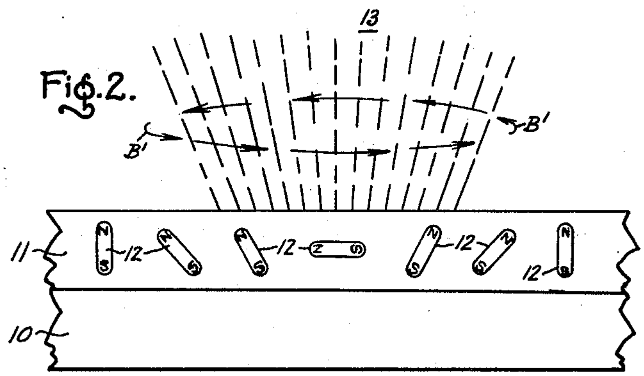
FIGURE 2 is a diagrammatic sectional view of a thermoplastic tape illustrating the action of a magnetic field on the magnetic particles during the recording process.

If now, while the plastic film 11 is still in fluid condition, the particles 12 are subjected to a magnetic field whose lines of flux are not parallel to the axes of the particles, they will tend to reorient themselves so that their axes are parallel to the lines of magnetic flux. FIGURE 2 illustrates this action, in which an electron beam 13 is focussed on the thermoplastic film 11. A magnetic field, shown by the arrows B′, which is induced by the flow of electrons in the beam 13, is generally circular in shape and is parallel to the plane of the thermoplastic film 11. Thus, the magnetic particles 12 tend to reorient themselves in a direction parallel to the magnetic field so that the particles in all parts of the film are no longer oriented in the same direction. The degree of reorientation, will, of course, depend on the strength of the magnetic field B′ as well as the length of time to which the particles 12 are subjected to the field. It is apparent that if the electron beam 13 is caused to scan along the film, or if the film is caused to move under the beam, and the beam is modulated as by turning it on and off, there will be distinct areas on the thermoplastic film 11 where the particles 12 are oriented in different directions. If the thermoplastic film 11 is then cooled to the point where it solidifies, the magnetic particles 12 will be immobilized and will remain with the orientation that they had when the film cooled. As will be pointed out hereafter, various orientations of the magnetic particles 12 may be utilized to effect the output of reading means whereby output signals corresponding to the input signals or modulation of the electron beam 13 may be obtained.

Although an electron beam has been described as providing a magnetic field parallel to the plane of the thermoplastic film for recording information, other field producing means may be employed. For example, a permanent magnet or an electromagnet may be brought into proximity with the film to reorient the magnetic particles. Also, the magnetic field need not be parallel to the plane of the film, but need only extend in a direction such that the particles under its influence can have the angle between their axes and the plane of the film substantially changed.

Figure 3:
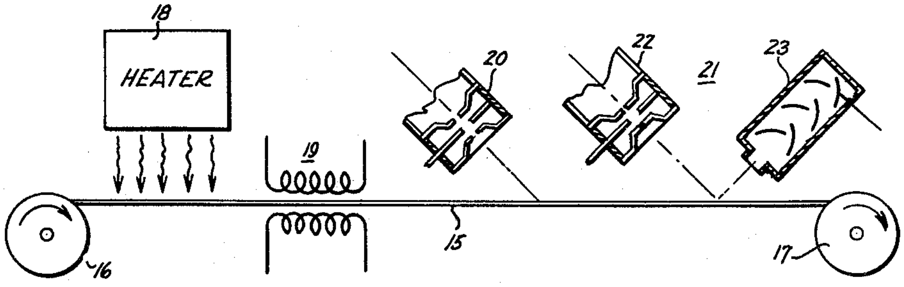
FIGURE 3 is a diagrammatic view of a storage system constructed in accordance with the invention.

FIGURE 3 illustrates an apparatus for recording and reading out information on a thermoplastic film, wherein a thermoplastic film 15 of the type described with reference to FIGURES 1 and 2 moves between a storage reel 16 and a take-up reel 17. As the thermoplastic tape moves between the reels it passes, in sequence, a heating station 18, an alignment station 19, a recording or writing station 20, and a reading or retrieval station 21.

It is assumed that, in the thermoplastic tape stored on the reel 16, elongated magnetic particles are randomly dispersed and aligned, or, in the case of a tape that has been used before, the particles are aligned in accordance with the information that was previously stored. Therefore, it is necessary to align similarly all of the particles so that new information may be stored on the tape. That is the function of the heating station 18 and the alignment station 19.

The heating station 18 provides means for heating the film to a plastic condition, which may be accomplished in any one of a number of ways. For example, the heating station 18 may comprise a conventional resistance heater which warms the thermoplastic film by radiation; it may be a suitable infrared apparatus or it may be a radio frequency inductive heating device. In the latter case, it is believed that the magnetic particles dispersed in the thermoplastic film will serve adequately as conductors, so that no conducting layer is required between the thermoplastic film and the base material in the tape. It is important to note, however, that regardless of the heating method employed, the temperature to which the thermoplastic film is heated must be below that of the Curie point of the magnetic particles.

After the thermoplastic film is heated to a molten or plastic condition, and while it remains in that condition, it passes through the alignment station 19 wherein the elongated magnetic particles are caused to align themselves with their axes making substantially identical angles with the plane of the film as previously described. Alignment may conveniently be accomplished by conventional electromagnetic means or by means of a permanent magnet, and should be substantially uniform across the entire area of the tape where information is to be stored. Both the heating means 18 and the alignment means 19 may be energized from conventional sources of power (not shown).

After the elongated magnetic particles have been aligned and while the tape is still in a plastic condition, it passes to the writing or recording station 20. At the recording station 20, a localized magnetic field is provided; that is, in the example illustrated, essentially parallel to the plane of the thermoplastic film 15, so that the orientation or alignment of the elongated magnetic particles subject to the field is changed in the manner described with reference to FIGURE 2.

Various means, such as a permanent magnet or electromagnet, may be employed to produce the required magnetic field to realign the particles at the recording station 1. However, it has been found that many advantages in the area of scanning ability and storage density are derived from the use of an electron microscope optical system which is inherently capable of producing a focussed beam of electrons having a diameter as small as 50 angstrom units. Such electron optical systems are well known in the art and, therefore, only the objective lens assembly has been shown diagrammatically in FIGURE 3. For a complete description of such devices, reference is made to the book Electron Microscope by D. Gabor, published by the Chemical Publishing Co., Inc., Brooklyn, New York, 1948. In addition, the book entitled Electron Microscopy by V. E. Cosslett, Academy Press Inc., London & New York, 1951, contains an excellent discussion of the principles of operation of such devices. Furthermore, patent application Serial No. 79,925 filed December 30, 1960, by Sterling P. Newberry and assigned to the assignee of the present invention, fully explains the operation of an electron microscope optical system and its use as a recording means. As pointed out in that application, the electron microscope optical system contains a deflection system for displacing the electron beam to achieve scanning of a storage element such as the thermoplastic tape 15. The thermoplastic film 15 may be moved through the recording station 20 while the electron beam from the electron microscope optical system scans it and is alternately turned on and off in accordance with binary input information. Thus, if binary information is being recorded, a matrix of discrete areas may be produced on the thermoplastic tape with the alignment of the magnetic particles in those areas altered from that which was produced when the tape went through the alignment station 19. As pointed out in the aforementioned Newberry application, both the scanning of the electron beam and blanking of the beam may be controlled directly from the data output terminal of a computer in which binary information is produced in the form of a "pulse" and "no pulse" train. The movement of the tape may be synchronized with the scan by conventional well known means controlling movement of the reel 17.

After the thermoplastic film has passed through the writing station 20 and the desired information is recorded thereon by changing the alignment of the elongated magnetic particles in discrete areas, the tape is permitted to cool so that the magnetic particles are permanently held in the positions they attained in passing through the writing station. This may be done by permitting the tape to cool naturally, or conventional cooling means may be provided to speed up the process. The tape may then be stored until it is desired to read back the information at some future time, or it may be read out before storage as at the reading or retrieval station 21. If the stored information has been recorded on the tape by means of an electron microscope optical system, a similar system in conjunction with an electron multiplier may conveniently be used to read out the information, or, if the information is not to be read out immediately, the recording optical system may be adapted for reading. As shown in FIGURE 3, at the reading station 21, an electron microscope optical system 22 directs on the tape a focussed beam of electrons, with the beam having the same diameter as that which wrote the information on the tape, and which is reflected from the magnetic particles embedded in the tape. It has been found that the number of electrons reflected by the magnetic particles varies depending on the angles their axes make with the plane of the tape. Thus, the output of the electron multiplier 23 varies in a manner controlled by the alignment of the magnetic particles as they are scanned by the electron beam from the optical system 22. A similar reading means is described in detail in the aforementioned Newberry patent application.

Although the previous description referred to the recording and reading of binary or pulse information, it is apparent that many forms of data may be stored by utilizing the teachings of the invention. For example, the localized magnetic field used in recording may be caused to scan and be modulated in such a manner as to form a character on the thermoplastic material, which can then be read by similarly scanning with the reading beam. Also, it is within the contemplation of the invention that not only black and white or binary information can be recorded, but that "gray scale" information, including digital and analog information can be so recorded and read. For example, in the apparatus shown in FIGURE 3, the scanning rate and the intensity of the recording electron beam may be varied to align the elongated magnetic particles so that their axes make various angles with the plane of the film. Thus, when the reading beam scans the tape in the proper manner, continuously variable output signals may be obtained which can be reconstructed to reproduce the stored information. Such techniques are well within present day electronic and computer technology.

Although various forms of this invention have been described, it will, of course, be understood that the invention is not limited thereto since many further modifications, both as to the arrangement and components employed, may be made. It is contemplated by the appended claim to cover any such modifications which fall within the true spirit and scope of the invention.

What I claim as new and desire to secure by Letters Patent of the United States is:

A system for recording information on a thermoplastic storage medium having elongated magnetic particles dispersed therein comprising means for heating the storage medium to a plastic condition, means for subjecting the storage medium to a magnetic field to align the elongated magnetic particles with their axes making substantially the same angle with the plane of the storage medium, while the storage medium is still in a plastic condition, recording means for subjecting the magnetic particles to localized magnetic fields to realign the axes of the magnetic particles in discrete areas of the storage medium to represent stored information while the storage medium is still in a plastic condition, and electron microscope readout means responsive to the alignment of the axes of the magnetic particles for retrieving the information.

References Cited by the Examiner

UNITED STATES PATENTS

| | | | |
|---|---|---|---|
| 2,796,359 | 6/57 | Speed | 117—62 |
| 3,072,543 | 1/63 | Lubow et al. | 179—100.1 |

FOREIGN PATENTS

| | | |
|---|---|---|
| 95,523 | 4/39 | Sweden. |

IRVING L. SRAGOW, *Primary Examiner.*

STEPHEN W. CAPELLI, *Examiner.*